United States Patent
Komiya

(10) Patent No.: US 7,040,081 B2
(45) Date of Patent: May 9, 2006

(54) LOW NOISE CABLE OR THE LIKE PROTECTION AND GUIDE DEVICE

(75) Inventor: Shoichiro Komiya, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 45 days.

(21) Appl. No.: 11/041,850

(22) Filed: Jan. 24, 2005

(65) Prior Publication Data
US 2005/0198937 A1   Sep. 15, 2005

(30) Foreign Application Priority Data
Mar. 11, 2004 (JP) .............................. 2004-069139

(51) Int. Cl.
*F16G 13/00* (2006.01)
*F16L 11/00* (2006.01)

(52) U.S. Cl. ........................... 59/78.1; 59/900; 248/49; 248/51

(58) Field of Classification Search ................. 59/78.1; 248/49, 51
See application file for complete search history.

(56) References Cited

U.S. PATENT DOCUMENTS

| | | | | |
|---|---|---|---|---|
| 5,174,104 A | * | 12/1992 | Wehler et al. | 59/78.1 |
| 5,771,676 A | * | 6/1998 | Komiya et al. | 59/78.1 |
| 5,987,873 A | | 11/1999 | Blase | |
| 6,016,844 A | * | 1/2000 | Takahashi et al. | 59/78.1 |
| 6,173,560 B1 | * | 1/2001 | Weber | 59/78.1 |
| 6,864,425 B1 | * | 3/2005 | Ikeda et al. | 59/78.1 |

FOREIGN PATENT DOCUMENTS

JP        P3110766        9/2000

* cited by examiner

Primary Examiner—David Jones
(74) Attorney, Agent, or Firm—Woodling, Krost and Rust

(57) ABSTRACT

A low noise cable or the like protection and guide device is provided, which can suppress sliding contact wear of a sliding portion, which is liable to occur at the time of braking the rotation of connected link frame bodies, and can avoid collision noise and a braking load, which are liable to occur in a sliding portion at a rotation terminal position, and is easily formed. In a low noise cable or the like protection and guide, a number of connected link frame bodies 100 are each composed of a pair of link plates 110, 110 disposed on both sides of the cable or the like C, each link plate having a connecting pin 111*a*-formed offset outside surface 111 and a pin hole 112*a*-formed offset inside surface 112, and connecting rods 120, 120 respectively spanned across a bending outer circumferential side and a bending inner circumferential side of the link plates 110, and the offset outside surface 111 is provided with a braking protrusion 111*b* and a stopper inclined plane 111*c* and the offset inside surface 112 is provided with a braking inclined plane 112*b* and a recess groove 112*c* so that the rotation of connected link frame bodies is restricted.

8 Claims, 5 Drawing Sheets

LOW NOISE CABLE OR THE LIKE PROTECTION AND GUIDE DEVICE

This application claims priority to Japanese Patent Application No. 2004-069139 filed Mar. 11, 2004.

FIELD OF THE INVENTION

The present invention relates to a cable or the like protection and guide device, and more specifically relates to a low noise cable or the like protection and guide device, which accommodates cables or the like such as cables or hoses which supply a movable member of an industrial machine with energy such as electric power or compressed air, and guides and supports the cable or the like with stability and reliability during movement of a portable part of the industrial machine.

BACKGROUND ART

Related Art

As such types of cable or the like protection and guide devices like an energy guide chain are known, which guide a hose or the like with a plurality of connected chain elements comprising side members and crossbars, between two contact points where at least one of the points can be position-changed, and in which a relative pivotability of adjacent chain elements is restricted by corresponding stopper portions disposed in the chain elements with each having a contact surface (see for example Patent Reference 1).

Patent Reference 1: Specification of Japanese Patent No. 3110766.

PROBLEMS TO BE SOLVED BY THE INVENTION

However, since the energy guide chain described in the above-mentioned Specification of Japanese Patent No. 3110766 provides a sliding portion in a circumferential direction about a connecting pin to reduce relative angle change speed by sliding resistance of the sliding portion, there is a problem that long use of the chain advances wear between connected chain elements and generates a braking failure whereby noises, which occur at the time of bending or the like, cannot be reduced sufficiently. Further, since the material of the sliding portion is the same material of the chain side member, an increase in the material strength of the chain side member makes an elastic deformation difficult and sliding resistance at the time of bending increases so that a bending failure is generated. Thus there are problems: a decrease in function as the chain guide chain is used and the sliding resistance is difficult to control.

Thus, the present invention solves the above-mentioned problems. Namely, the object of the present invention is to provide a low noise cable or the like protection and guide device which can suppress sliding contact wear of a sliding portion that is liable to occur at the time of braking the rotation of connected link frame bodies. Also, this device can avoid collision noise and a braking load which are liable to occur in a sliding portion at a rotation terminal position. This low noise cable or the like protection and guide device is easily formed and manufactured. Further, the low noise cable or the like protection and guide device can reliably control the rotation of connected link frame bodies in a bending mode.

MEANS FOR SOLVING THE PROBLEMS

To attain the above-mentioned object in the invention a low noise cable or the like protection and guide in which a number of link frame bodies articulably connected to each other with a cable or the like inserted therein, are each composed of a pair of link plates disposed on both sides of the cable or the like, each link plate having a connecting pin-formed offset outside surface and a pin hole-formed offset inside surface on the front and rear of said plate respectively, and connecting rods respectively spanned across a bending outer circumferential side and a bending inner circumferential side of said link plates. The low noise cable or the like protection and guide is characterized in that any one of said offset outside surface and said offset inside surface is provided with a braking protrusion and a stopper inclined plane and the other is provided with a braking inclined plane which said braking protrusion slidingly contacts and climbs on and into a recess groove into which said braking protrusion is moved so that the rotation of connected link frame bodies is restricted.

And the invention further attains the above-mentioned objects by providing inclination angles of said stopper inclined plane and said braking inclined plane which are different from each other.

Further, attains the above-mentioned objects by providing that said braking protrusion, said stopper inclined plane, said braking inclined plane and said recess groove are respectively provided in a rotating range of mutually connected link frame bodies.

Further, attains the above-mentioned objects by providing that said offset outside surface is provided with a pin side locking surface and said offset inside surface is provided with a pin hole side locking surface and the rotation of the connected link frame bodies is restricted by abutment of said pin side locking surface and said pin hole side locking surface.

EFFECT OF THE INVENTION

In the low noise cable or the like protection and guide device of the present invention, a number of link frame bodies articulably connected to each other with a cable or the like inserted therein, are each composed of a pair of link plates disposed on both sides of the cable or the like, each link plate having a connecting pin-formed offset outside braking surface and a pin hole-formed offset inside surface on the front and rear of said plate respectively, and connecting rods respectively spanned across a bending outer circumferential side and a bending inner circumferential side of said link plates. Accordingly, a cable or the like such as a cable or a hose is accommodated in a number of connected link frame bodies so that the cable or the like can be guided and supported even during movement of a portable part of the industrial machine.

And since the low noise cable or the like protection and guide device of the present invention has peculiar device features the following effects can be exerted.

According to the present invention, any one of an offset outside surface and an offset inside surface of a pair of link plates disposed on both sides in a link frame body is provided with a braking protrusion and a stopper inclined plane and the other is provided with a braking inclined plane which the braking protrusion slidingly contacts and climbs on and into a recess groove until the braking inclined plane is moved against the inclined surface of the outside braking surface so that the rotation of connected link frame bodies is restricted. Thus, when the braking protrusion of one link plate generates sliding resistance to brake while climbing over an opposed braking inclined surface of the other connected link plate, the connected link plates are elastically deformed like a plate spring so that sliding contact wear of the braking protrusion can be suppressed. When the braking protrusion is provided in the vicinity of the rotating side peripheral edge of the link plate, the link plate is liable to be elastically deformed and the sliding contact wear of the braking protrusion can be further suppressed.

And when a stopper inclined surface of one of two connected link plates collides with a braking inclined surface of the other link plate at a rotating terminal position of these connected link plates, both inclined surfaces abut on each other. Thus a rapid collision is avoided so that collision noise can be suppressed. Further, if an inclined surface angle or an inclined surface length of the braking inclined surface and the stopper inclined surface is changed or a linear area after climbing the braking inclined surface is increased, the generation mechanisms of sliding resistance and collision noise are easily controlled so that optimum braking and reduced noise in accordance with the size of the link plate can be attained. Consequently, the molding of the link plate is easy.

In the invention a recess groove instantly removes sliding resistance of the braking protrusion which significantly reduces the rotating speed of connected link plates when the braking protrusion climbs the braking inclined surface. Thus, a continuous excess load, which is liable to occur in the braking protrusion is removed so that endurance can be ensured. Further, when in the present invention of a long span specification, the connected link plates are rotated so as to be in a linear mode and the braking protrusion is moved into the recess groove, even if the braking protrusion is buckled by an action of a compression force in a connecting direction, it engages with the recess groove whereby an accidental buckling can be suppressed.

According to the present invention inclination angles of the stopper inclined plane and the braking inclined plane are different from each other. Thus, even if the inclined surfaces abut on each other, rupture noise does not occur whereby low noise can be further attained.

According to the present invention the braking protrusion, the stopper inclined plane, the braking inclined plane and the recess groove are respectively provided in a rotating range of mutually connected link frame bodies. Thus, the above-mentioned braking function can be reliably exhibited until the connected link frame bodies reach a rotating terminal position.

According to the present invention, the offset outside surface is provided with a pin side locking surface and said offset inside surface is provided with a pin hole side locking surface and the rotation of the connected link frame bodies is restricted by abutment of the pin side locking surface and the pin hole side locking surface. Thus, an influence of the locking load, which is generated at a rotating terminal position, on the stopper inclined surface and the braking inclined surface can be avoided. Accordingly, the endurance of the stopper inclined surface and braking inclined surface can be ensured for a long period and molding for further improving rigidity of the pin side locking surface and the pin hole side locking surface irrespective of the stopper inclined surface and the braking inclined surface can be easily realized.

BRIEF DESCRIPTION OF THE DRAWINGS

FIG. 3 is an explanatory view of a braking state of the present example 1.

A better understanding of the drawings will be had when reference is made to the Description of the Invention and Claims which follow hereinbelow.

DESCRIPTION OF THE INVENTION

In the low noise cable or the like protection and guide device of the present invention, a number of link frame bodies articulably connected to each other with a cable or the like inserted therein, are each composed of a pair of link plates disposed on both sides of the cable or the like, each link plate having a connecting pin-formed offset outside surface and a pin hole-formed offset inside surface on the front and rear of said plate respectively, and connecting rods respectively spanned across a bending outer circumferential side and a bending inner circumferential side of said link plates, and any one of said offset outside surface and said offset inside surface is provided with a braking protrusion and a stopper inclined plane and the other is provided with a braking inclined plane which said braking protrusion slides over and into a recess groove so that the rotation of connected link frame bodies is restricted. Any concrete embodiment thereof may be used.

Namely, with respect to a concrete form of the braking protrusion provided in the link plate of the present invention any forms such as a ridge form, a triangular pyramid form, and a hemispherical form by which sliding resistance is generated to brake while climbing over a braking inclined surface, may be used.

Further, with respect to a concrete form of the braking inclined surface provided on the link plate, any inclined surface forms, by which braking can be performed while cooperating with a braking protrusion and a stopper inclined surface, may be used. Further, any changes of an inclined surface angle or an inclined surface length or an increase in a linear area after climbing according to the relationships between the braking protrusion and the stopper inclined surface, may be used.

Further, with respect to the braking protrusion and the stopper inclined surface, any one of an offset outside surface and an offset inside surface of the link plate may be used. In a case where they are provided on the offset outside surface, the link plate is liable to be elastically deformed so that sliding contact wear of the braking protrusion can be more suppressed, or in a case where they are provided on the offset-inside surface, steps formed on the offset inside surface are decreased so that a mold structure for molding can be made simple.

EXAMPLE 1

A low noise cable or the like protection and guide device according to example 1 of the present invention will be described with reference to drawings.

Figure 1:
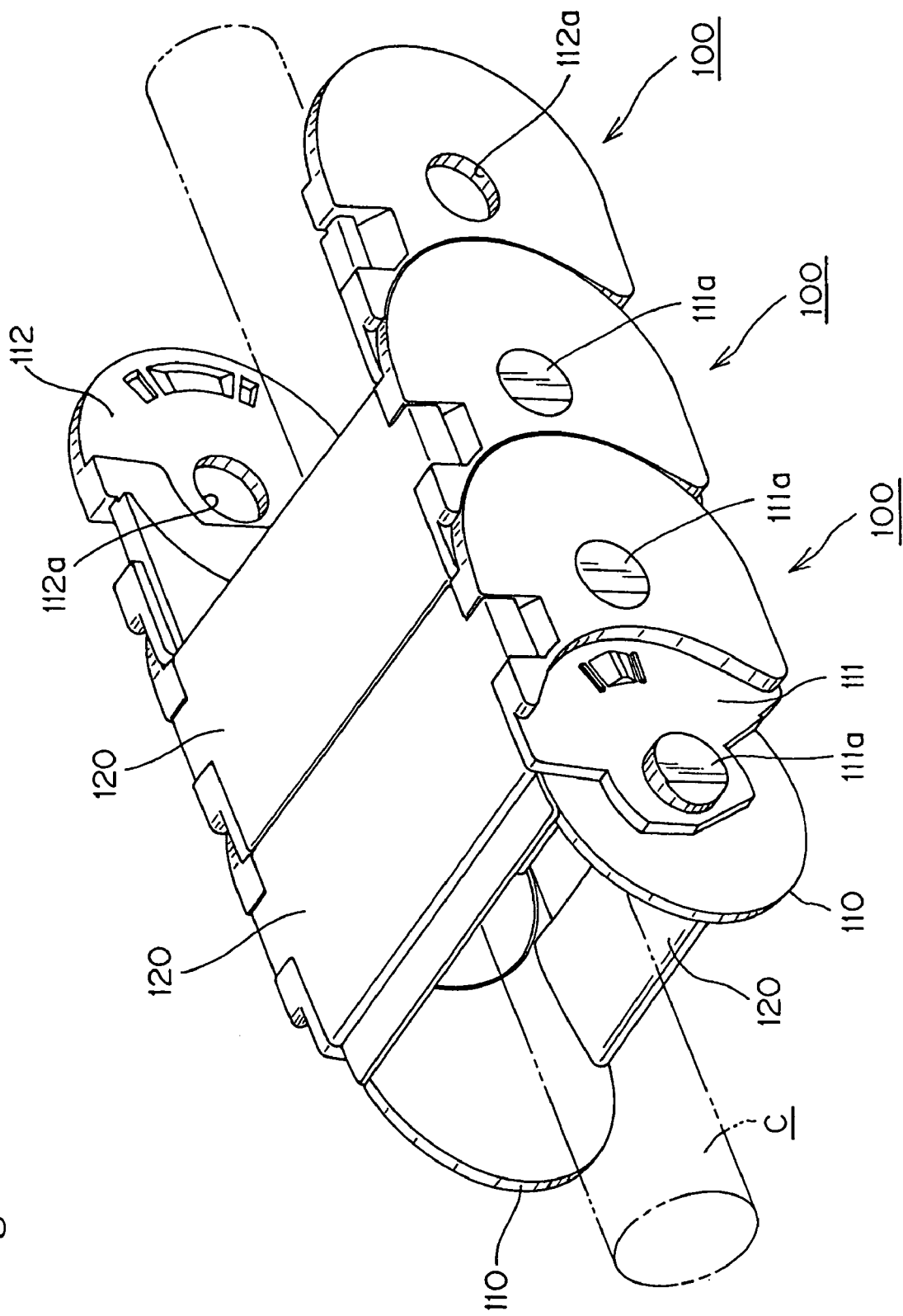
FIG. 1 is a perspective view showing a low noise cable or the like protection and guide device, which is example 1 according to the present invention.
Figure 2:
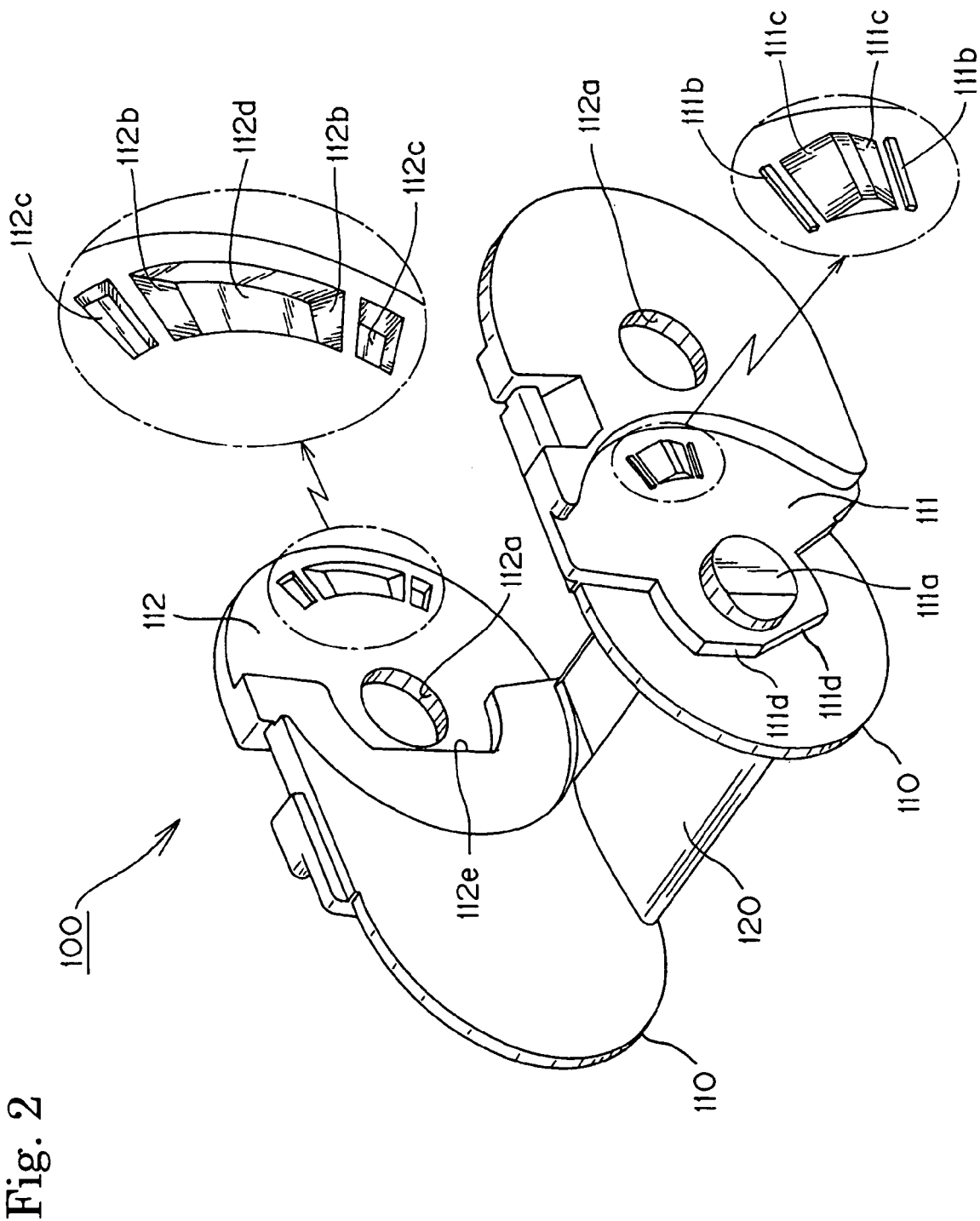
FIG. 2 is an enlarged perspective view of a link frame body of the present example 1.

FIG. 1 is a perspective view showing the low noise cable or the like protection and guide device according to example 1 of the present invention, FIG. 2 is an enlarged perspective view of a link plate and FIG. 3 is an explanatory view of a braking state. In the low noise cable or the like protection and guide device of example 1 of the present invention, as shown in FIG. 1, a synthetic resin link frame body 100 to be articulably connected in plural numbers with a cable or the like C such as a cable or a hose inserted therein, comprises a pair of link plates 110, 110 disposed on both sides of the cable or the like C, and connecting rods 120, 120 respectively spanned across a bending outer circumferential side and a bending inner circumferential side of the link plates, and a connecting pin 111a-formed offset-outside surface 111 and a pin hole 112a-formed offset inside surface 112 are provided on front and rear portions of each link plate.

Namely, a large number of link frame bodies 100 are connected by fitting the connecting pins 111a formed on the offset outside surfaces 111 of a preceding link plates to pin holes 112a formed on the following offset inside surfaces 112.

Although not shown, in the low noise cable or the like protection and guide device of example 1 of the present invention each front end portion and each terminal end portion of the large number of connected link frame bodies 100 are respectively connected to a movable side fitting fixed to a movable portion side and a fixed side fitting fixed to a stationary portion side. Further the low noise cable or the like protection and guide device accommodates a cable or the like C, which supplies a movable member of an industrial machine with energy such as electric power or compressed air, and is a stable, reliable, guide and support for the cable or the like C.

As shown in FIG. 2, on offset outside surfaces 111, 111 of a pair of link plates 110, 110 disposed on both sides of the link frame body 100, ridge-shaped braking protrusions 111b, 111b are provided and are disposed on the bending outer circumferential side and the bending inner circumferential side of the link plates 110, 110. An angle stopper inclined surface 111c intervening between protrusions 111b is provided. Offset inside surfaces 112, 112 include a pair of braking inclined surfaces 112b, 112b disposed on the bending outer circumferential side and the bending inner circumferential side of the link plates 110, 110 and a pair of recess grooves 112c, 112c adjacent to the braking inclined surfaces 112b, 112b and disposed on the bending outer circumferential side and the bending inner circumferential side and into which the braking protrusions 111b, 111b, which climbed over the braking inclined surfaces 112b, 112b, are moved. It is noted that a reference numeral 112d denotes a guide groove for guiding the braking protrusion 111b and the stopper inclined surface 111c.

Further, when the braking protrusion 111b of the preceding link plate 110 generates sliding resistance to brake while coming into sliding contact with and climbing over the opposed braking inclined surface 112b of the following link plate 110, the connected link plates 110 are elastically deformed like a plate spring to suppress sliding contact wear of the braking protrusion 111b.

Further, the braking protrusion 111b of the present example 1 is provided in the vicinity of a rotating side peripheral edge of the link plate 110 so that the link plate 110 is liable to be elastically deformed and the sliding contact wear of the braking protrusion 111b is more suppressed.

And the above-mentioned braking protrusion 111b, the stopper inclined surface 111c, the braking inclined surface 112b and the recess groove 112c are respectively provided in rotating regions of mutually connected link frame bodies 100, 100, so that a braking function can be reliably exhibited until reaching the rotating terminal position of the connected link frame bodies 100, 100.

Further, as shown in FIG. 2, in example 1, a pin side locking surface 111d is provided on the offset outside surface 111 of the link plate 110, and a pin hole side locking surface 112e is provided on the offset inside surface 112, and the pin side locking surface 111d and the pin hole side locking surface 112e are abutted on each other so that the rotation of the connected link frame bodies are restricted. Accordingly, an influence of the locking load, which is generated at a rotating terminal position exhibiting the maximum bending mode, on the stopper inclined surface 111c and the braking inclined surface 112b is avoided. Thus, the endurance of the stopper inclined surface 111c and the braking inclined surface 112b is ensured for a long period. Molding for further improving rigidity of the pin side locking surface 112e and the pin hole side locking surface 111d irrespective of the stopper inclined surface 111c and the braking inclined surface 112b can be easily realized.

The thus obtained low noise cable or the like protection and guide device of the present example 1 is operated as shown in FIG. 3.

Figure 3A:
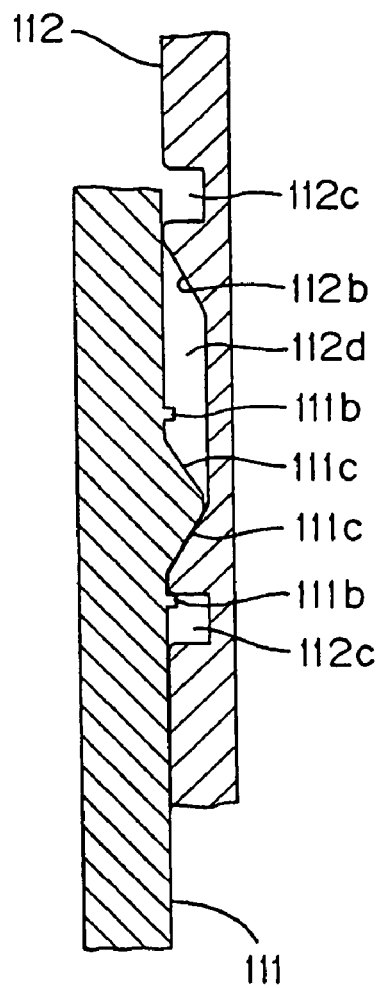
FIG. 3(A) shows an operation state at a rotating terminal position where link frame bodies are connected in a linear mode.
Figure 3B:
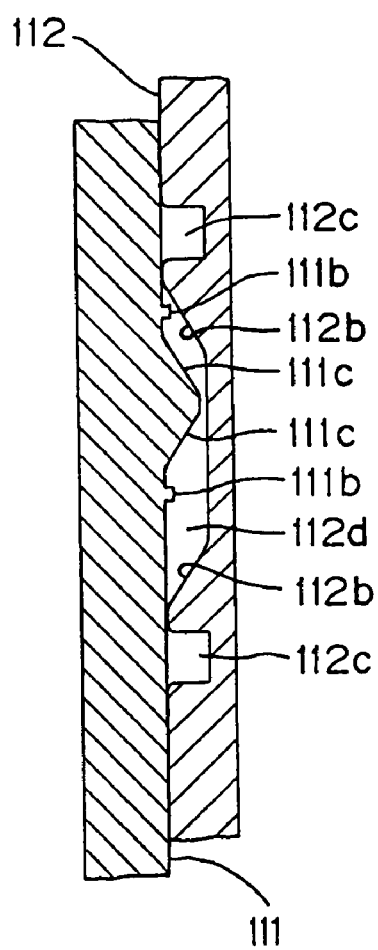
FIG. 3(B) shows an operation state in a bending mode in a middle stage where connected link frame bodies reaches the rotating terminal position.
Figure 3C:
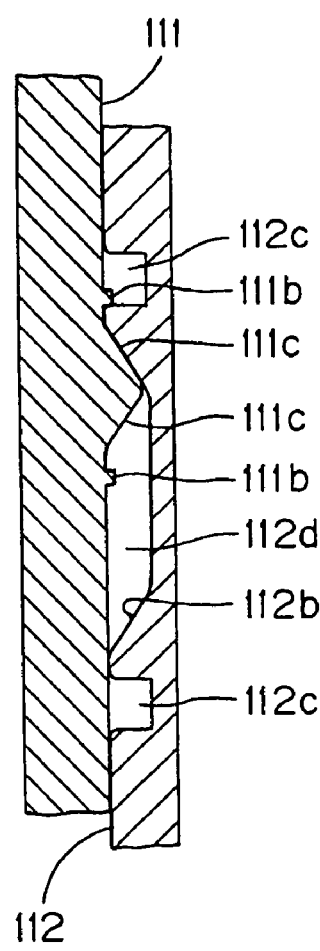
FIG. 3(C) shows an operation state at a rotating terminal position where connected link frame bodies exhibit a maximum bending mode.

FIG. 3(A) shows an operation state at a rotating terminal position where link frame bodies are connected in a linear mode, FIG. 3(B) shows an operation state in a bending mode in a middle stage where connected link frame bodies reaches the rotating terminal position, and FIG. 3(C) shows an operation state at a rotating terminal position where connected link frame bodies exhibit in a maximum bending mode.

First, in a case where the connected link frame bodies are in a linear mode, as shown in FIG. 3(A), the braking protrusion 111b is moved into the recess groove 112c so that the stopper inclined surface 111c is abutted on the braking inclined surface 112b. Then although not shown, a pin side locking surface 111d on the offset outside surface 111 side is abutted on a pin hole side braking surface 111e on the offset inside surface 112 side so that the rotation of the connected link frame bodies is restricted to keep a linear mode.

Then, in a case of a midway stage where the link frame bodies reach the rotation terminal position, as shown in FIG. 3(B) the offset outside surface 111d side braking protrusion 111b and the stopper inclined surface 111c move in the offset inside surface 112 side guide groove 112d.

And in a case where the connected link frame bodies are most bent in a bending mode, as shown in FIG. 3(C), the braking protrusion 111b is moved into the recess groove 112c so that the stopper inclined surface 111c is abutted on the braking inclined surface 112b. Then although not shown, a pin side locking surface 111d on the offset outside surface 111 side is abutted on a pin hole side braking surface 111e on the offset inside surface 112 side so that the rotation of the connected link frame bodies is restricted.

Therefore, in the low noise cable or the like protection and guide device of the present example 1, sliding contact wear of a sliding portion, which is liable to occur at the time of braking the rotation of connected link frame bodies 100, 100, can be suppressed, collision noise and a braking load, which are liable to occur in a sliding portion at a rotation terminal position, can be avoided, and the molding of the device is simple. Further, the rotation of connected link frame bodies in a bending mode can be reliably controlled. Thus, the beneficial effects are very significant.

EXAMPLE 2

A low noise cable or the like protection and guide device according to example 2 of the present invention will be described below with reference to a perspective view shown in FIG. 4.

Figure 4:
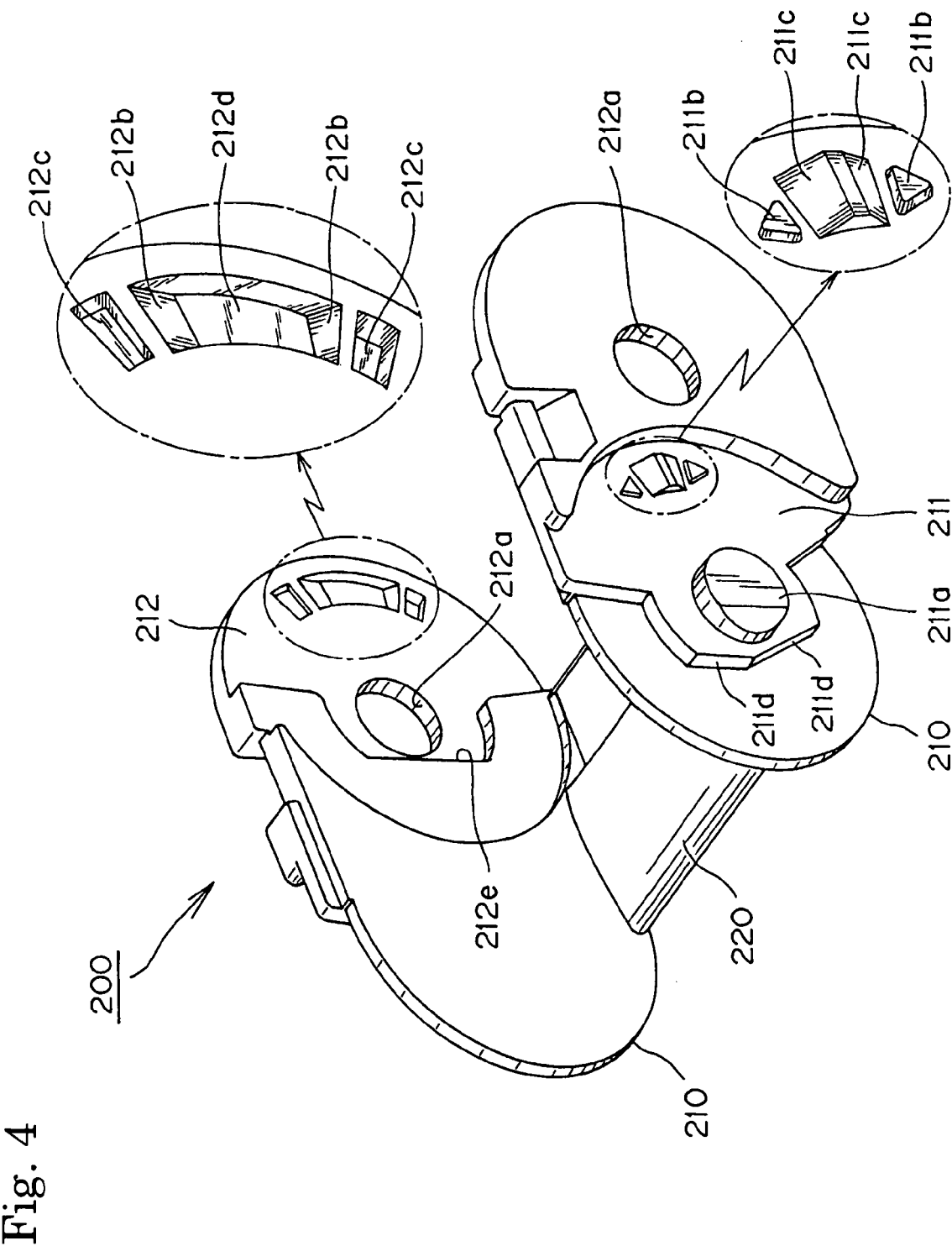
FIG. 4 is a perspective view showing a low noise cable or the like protection and guide device, which is example 2 according to the present invention.

In the low noise cable or the like protection and guide device of the example 2 of the present invention, as shown in FIG. 4, a synthetic resin link frame body 200 to be articulably connected in plural numbers with a cable or the like C such as a cable or a hose inserted therein, comprises a pair of link plates 210, 210 disposed on both sides of the cable or the like C, and connecting rods 220, 220 respectively spanned across a bending outer circumferential side and a bending inner circumferential side of the link plates, and a connecting pin 211a-formed offset outside surface 211 and a pin hole 212a-formed offset inside surface 212 are provided on front and rear portions of each link plate. And on offset outside surfaces 211, 211 of a pair of link plates 210, 210 disposed on both sides of the link frame body 200 are provided triangular pyramid-shaped braking protrusions 211b, 211b respectively disposed on the bending outer circumferential side and the bending inner circumferential side of the link plates 210, 210. An angle stopper inclined surface 211c intervenes between these protrusions 211b. Offset inside surfaces 212, 212 include a pair of braking inclined surfaces 212b, 212b disposed on the bending outer circumferential side and the bending inner circumferential side of the link plates 210, 210 and a pair of recess grooves 212c, 212c adjacent to the braking inclined surfaces 212b, 212b and disposed on the bending outer circumferential side and the bending inner circumferential side and into which the braking protrusions 211b, 211b, which climbed over the braking inclined surfaces 212b, 212b, are moved.

In summary, when the low noise cable or the like protection and guide device of the present example 2 is compared with the above-mentioned the low noise cable or the like protection and guide device of the present example 1, the braking protrusion 211b has been formed in a triangular pyramid and other device features are not changed.

Therefore, the effects exerted by the low noise cable or the like protection and guide device of the present example 2 are the same as the effects exerted by the low noise cable or the like protection and guide device of the present example 1, and are also very significant.

EXAMPLE 3

A low noise cable or the like protection and guide device according to example 3 of the present invention will be described below with reference to a perspective view shown in FIG. 5.

Figure 5:
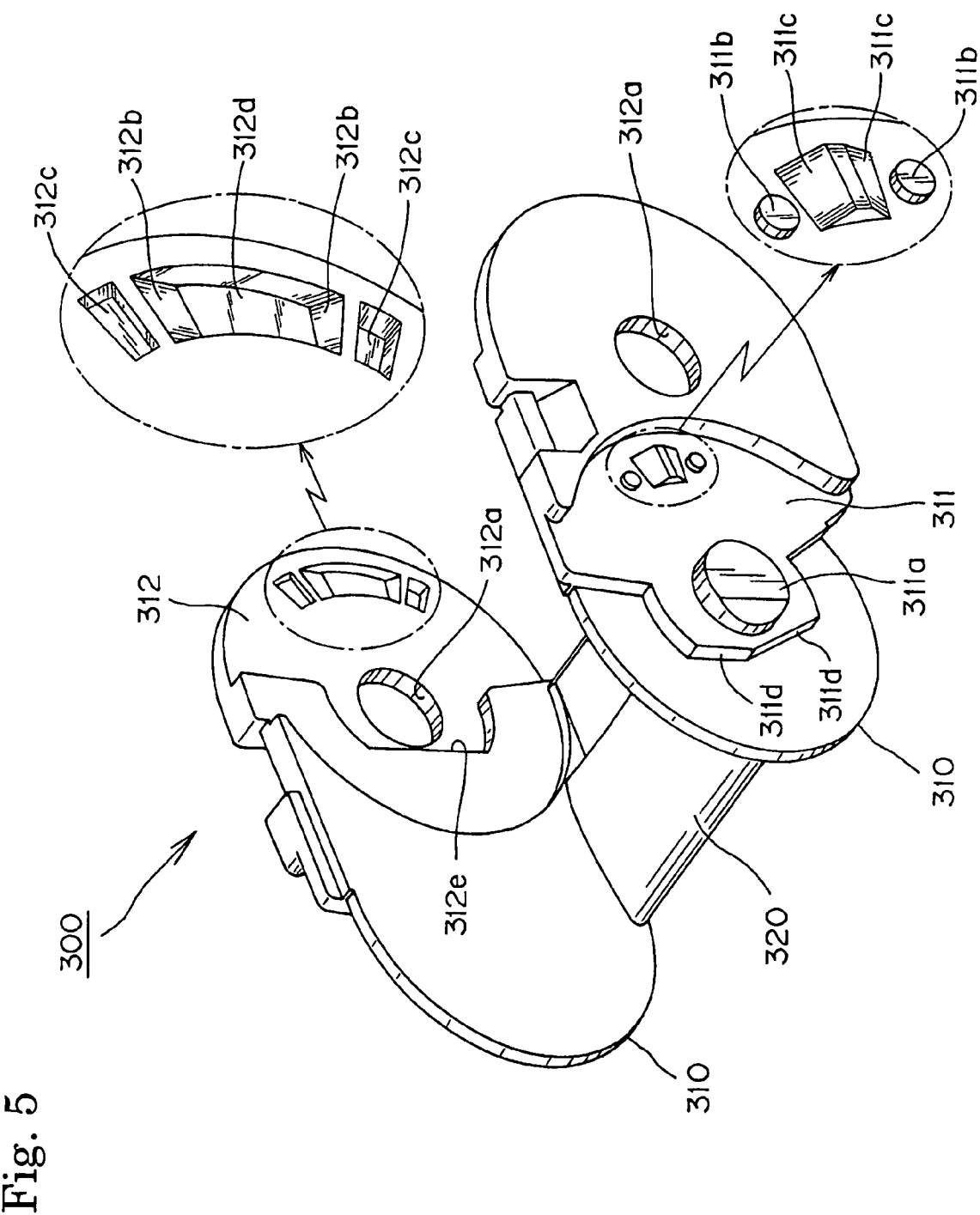
FIG. 5 is a perspective view showing a low noise cable or the like protection and guide device, which is example 3 according to the present invention.

In the low noise cable or the like protection and guide device of the example 3 of the present invention, as shown in FIG. 5, a synthetic resin link frame body 300 to be articulably connected in plural numbers with a cable or the like C such as a cable or a hose inserted therein, comprises a pair of link plates 310, 310 disposed on both sides of the cable or the like C, and connecting rods 320, 320 respectively spanned across a bending outer circumferential side and a bending inner circumferential side of the link plates, and a connecting pin 311a-formed offset outside surface 311 and a pin hole 312a-formed offset inside surface 312 are provided on front and rear portions of each link plate.

And on offset-outside surfaces 311, 311 of a pair of link plates 310, 310 disposed on both sides of the link frame body 300 are provided hemispherical braking protrusions 311b, 311b respectively disposed on the bending outer circumferential side and the bending inner circumferential side of the link plates 310, 310. An angle stopper inclined surface 211c intervenes between these protrusions 311b. Offset inside surfaces 312, 312 include a pair of braking inclined surfaces 312b, 312b disposed on the bending outer circumferential side and the bending inner circumferential side of the link plates 310, 310 and a pair of recess grooves 312c, 312c adjacent to the braking inclined surfaces 312b, 312b and disposed on the bending outer circumferential side and the bending inner circumferential side and into which the braking protrusions 311b, 311b are moved after they have slid over the braking inclined surfaces 312b, 312b.

In summary, when the low noise cable or the like protection and guide device of the present example 3 is compared with the above-mentioned the low noise cable or the like protection and guide devices of the present examples 1 and 2, the braking protrusion 311b has been formed in a hemisphere and other device features are not changed.

Therefore, the effects exerted by the low noise cable or the like protection and guide device of the present example 3 are the same as the effects exerted by the low noise cable or the like protection and guide device of the present example 1, and are also very significant.

DESCRIPTION OF REFERENCE NUMERALS 100, 200, 300 . . . Link frame body
110, 210, 310 . . . Link plate
111, 211, 311 . . . Offset outside surface
111a, 211a, 311a . . . Connecting pin
111b, 211b, 311b . . . Braking protrusion
111c, 211c, 311c . . . Stopper inclined surface
111d, 211d, 311d . . . Pin side locking surface
112, 212, 312 . . . . Offset inside surface
112a, 212a, 312a . . . Pin hole
112b, 212b, 312b . . . Braking inclined surface
112c, 212c, 312c . . . Recess groove
112d, 212d, 312d . . . Guide groove
112e, 212e, 312e . . . Pin hole side locking surface
120, 220, 320 . . . Connecting rod
C . . . Cable or the like The invention has been set forth by way of examples and those skilled in the art will readily recognize that changes and modifications may be made to the examples without departing from the spirit and the scope of the appended claims.

I claim:

1. A low noise cable protection and guide in which a number of link frame bodies are articulably connected to each other with a cable inserted therein, each of said link frame bodies being connected to an adjacent link frame body, each link frame body comprises a pair of link plates disposed on both sides of the cable, each link plate includes a front portion and a rear portion, each said link plate includes a bending outer circumferential side and a bending inner circumferential side, each front portion of each said link plate includes an outside surface and a connecting pin protruding therefrom, each rear portion of each said link plate includes an inside surface and a pin hole therethrough, each of said outside surfaces of each of said link bodies being rotatably hinged by said pins to said pin holes of said inside surfaces of said adjacent link frame body, and connecting rods respectively spanned across said bending outer circumferential side and said bending inner circumferential side of each of said link plates, characterized in that:

each said outside surface of said link plates includes a braking protrusion and a stopper, said stopper includes a first inclined plane, each said inside surface of each of said link plates includes a braking surface, said braking surface includes a second inclined plane, each said inside surface of each of said link plates includes a recess therein, said second inclined plane of said braking surface of said inside surface slidingly engages said braking protrusion of said outside surface of an adjacent link plate until said braking protrusion of said outside surface engages said recess and said first inclined plane of said stopper engages said second inclined plane of said braking surface so that the rotation of connected link frame bodies is restricted.

2. The low noise cable protection and guide according to claim 1, characterized in that said first inclined plane of said stopper includes a first inclination angle and said second inclined plane of said braking surface includes a second inclination angle and said first and second inclination angles are different from each other.

3. The low noise cable protection and guide according to claim 1, characterized in that said braking protrusion of said outside surface, said first inclined plane of said stopper of said outside surface, said second inclined plane of said braking surface of said inside surface and said recess of said inside surface are respectively provided in a rotating arc of mutually connected link frame bodies.

4. The low noise cable protection and guide according to claim 2, characterized in that said braking protrusion of said outside surface, said first inclined plane of said stopper of said outside surface, said second inclined plane of said braking surface of said inside surface and said recess of said inside surface are respectively provided in a rotating arc of mutually connected link frame bodies.

5. The low noise cable and guide device according to claim 1, characterized in that said outside surface is provided with a pin side locking surface and said inside surface is provided with a pin hole side locking surface and the rotation of the connected link frame bodies is restricted by abutment of said pin side locking surface and said pin hole side locking surface.

6. The low noise cable and guide device according to claim 2, characterized in that said outside surface is provided with a pin side locking surface and said inside surface is provided with a pin hole side locking surface and the rotation of the connected link frame surface.

7. The low noise cable and guide device according to claim 3, characterized in that said outside surface is provided with a pin side locking surface and said inside surface is provided with a pin hole side locking surface and the rotation of the connected link frame bodies is restricted by abutment of said pin side locking surface and said pin hole side locking surface.

8. The low noise cable and guide device according to claim 4, characterized in that said outside surface is provided with a pin side locking surface and said inside surface is provided with a pin hole side locking surface and the rotation of the connected link frame bodies is restricted by abutment of said pin side locking surface and said pin hole side locking surface.

* * * * *

UNITED STATES PATENT AND TRADEMARK OFFICE
CERTIFICATE OF CORRECTION

PATENT NO.         : 7,040,081 B2
APPLICATION NO. : 11/041850
DATED                 : May 9, 2006
INVENTOR(S)        : Komiya It is certified that error appears in the above-identified patent and that said Letters Patent is hereby corrected as shown below:

Col. 10, line 19, after "frame" insert --bodies is restricted by abutment of said pin side locking surface and said pin hole locking--.

Signed and Sealed this

Eleventh Day of July, 2006

JON W. DUDAS
*Director of the United States Patent and Trademark Office*